Aug. 27, 1957   C. F. FENTON   2,804,494
HIGH FREQUENCY TRANSMISSION CABLE
Filed April 8, 1953
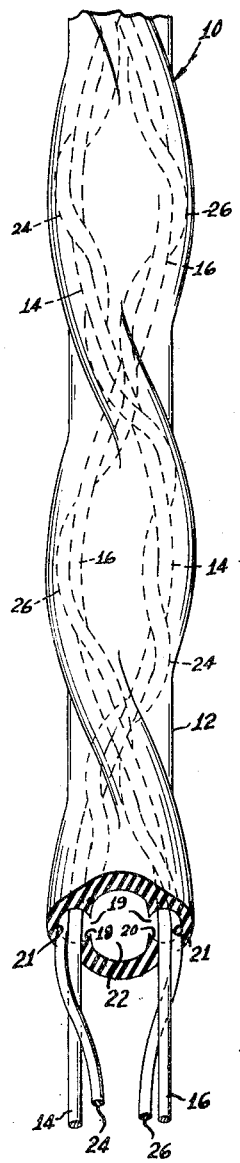
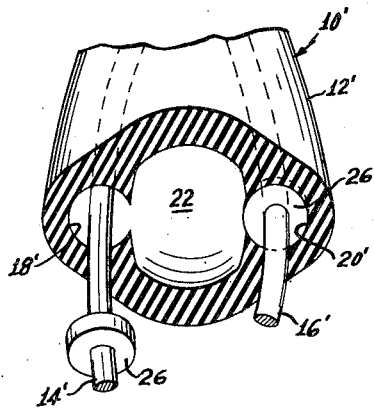
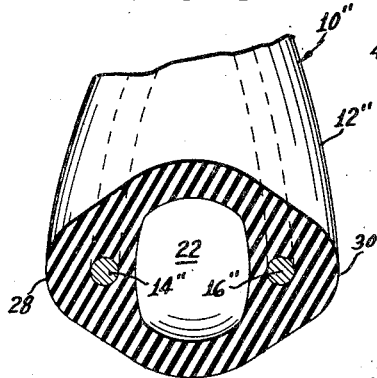
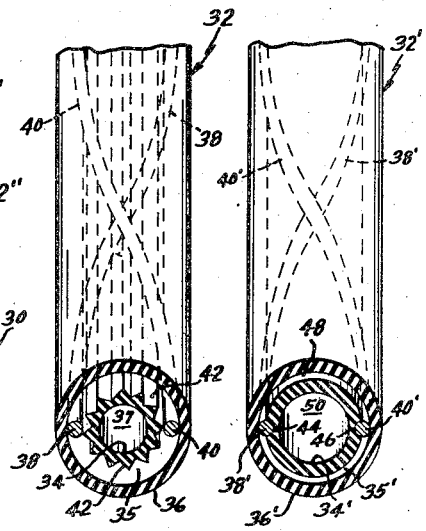
INVENTOR.
Charles F. Fenton
BY Edwin Levisohn &
Harry Cohen
ATTORNEYS

United States Patent Office 2,804,494
Patented Aug. 27, 1957

2,804,494

HIGH FREQUENCY TRANSMISSION CABLE

Charles F. Fenton, Jackson Heights, N. Y.

Application April 8, 1953, Serial No. 347,573

4 Claims. (Cl. 174—113)

The present invention relates generally to multiple-lead transmission cables and in particular to high frequency transmission lines of the type wherein the conductors are separated by air as a dielectric.

To reduce the noise pick-up of a multiple-lead transmission line, it is essential to maintain the same capacity between each conductor thereof and ground. Where a substantial length of transmission line, for example, a television lead-in cable, is run alongside of a metal girder, metal mast, or along a building wall the capacity between each conductor and the adjacent objects can be maintained equal if the conductors are transposed spirally in constant intervals. This is due to the fact that the relative position or proximity of each conductor and the adjacent grounded object changes in a constant manner throughout the length of the conductor, and in the same manner as the other conductors, so that the average proximity of each conductor and the grounded object is the same, whereby the average capacity between each conductor and the grounded object is the same. Where flat twin-lead transmission lines are used as lead-in cables, it is a well known practice to twist the line at intervals between the antenna and the receiver to reduce the interference pick-up. However, there is a disadvantage of relatively high electrostatic capacity when using the flat twin-lead line, due to the dielectric material between the leads. To reduce this high electrostatic capacity, tubular transmission cables are used. In these cables, the space between the conductors is filled largely with air, as the dielectric. However, these tubular cables, as presently constructed, are quite rigid, in order to prevent distortion, and therefore cannot be readily twisted in order to reduce interference or noise pick-up.

Pursuant to the present invention, and as the primary object thereof, provision is made for a high frequency transmission cable which retains the advantages of the tubular construction, in that the conductors are separated in the most part by air as the dielectric, and yet also provides for an equal and constant over-all capacity between each of the conductors and any grounded elements adjacent to which the conductors may be disposed.

In accordance with the foregoing object, and as another object of the present invention, provision is made to provide the conductors with spaced predetermined twists within the tubular casing and longitudinally thereof.

Another object is to provide means for retaining said conductors in equi-spaced twisted relation within the tubular casing or covering of the cable.

Pursuant to a further object, provision is made for a dual-tubular cable construction wherein the conductors are disposed in the form of equi-distant helices between coaxial tubular elements.

The above and other objects, features and advantages of the present invention will be more fully understood from the following description considered in connection with the accompanying illustrative drawings.

In the drawings:

Fig. 1 is a fragmentary sectional isometric view of a transmission cable pursuant to the best mode presently contemplated by me of carrying out my invention;

Fig. 2 is a view, on a larger scale, similar to Fig. 1 and illustrates another embodiment of the invention;

Fig. 3 is a view, on a larger scale, similar to Fig. 1 and illustrates another embodiment of the invention;

Figure 4 is a view similar to Fig. 1 and illustrates a further embodiment of the invention; and Fig. 5 is a view similar to Fig. 1 and illustrates a still further embodiment of the invention.

Referring now to Fig. 1 of the drawings in detail, the reference numeral 10 indicates a multiple-lead cable of the twin-lead type, the cable being generally of tubular construction. As here shown, the cable 10 comprises the tubular member 12 which is provided with the twin conductors 14 and 16. The tube 12 is formed of a suitable dielectric material, such as, for example, and not by way of limitation, polyethylene. The grooves 18 and 20 are formed in diametrically opposite portions of the tube wall at the inner surface thereof. Each groove extends longitudinally of the cable 10, through the tubular wall 12 thereof, in the form of an open helix and that the pitch of each of the helical grooves is the same, so that the spacing between the helical grooves remains constant throughout the longitudinal extent of the cable 10. The grooves are open at the inner sides thereof, as at 19, to communicate with the hollow center 22 of the tube 12, whereby to provide for an open air space which extends between the grooves and in communication therewith. It will be noted that the conductor 16 is disposed in and extends longitudinally of the groove 20 and, as so disposed, each conductor defines a similar open helix. Therefore, it will be apparent that the two conductors are maintained in a constant spaced relation throughout the longitudinal extent of the tubing 12, in which they form equi-distant helices.

In order to properly position and retain each of the conductors within the companion groove so that most of the space between the conductors is occupied by the air dielectric, provision is made for the spacing elements 24 and 26, for the companion conductors 14 and 16, respectively. As here shown, the spacing elements 24 and 26 are constituted by cords of dielectric material, such as for example, and not by way of limitation, polyethylene, which are spirally wound about the companion conducting elements within the companion grooves 18 and 20, respectively. The spiral winding of the cord about the companion conductor is quite loose so that a substantial portion of the companion conductor is directly exposed to the air dielectric through the open side of the companion groove. The conductors are maintained in position in the companion grooves by securing in a suitable manner the spiral cords to the inner wall of the tubing, within the companion grooves, for example and not by way of limitation, each of the cords may be fused or welded, as at 21, to the inner wall surface of the tubing 12 within the companion grooves. Therefore, in view of the foregoing it will be readily apparent that the cable 10 provides for a twin-lead construction wherein each of the conductors extends in the form of an open helix longitudinally of the cable, said helices being maintained in equi-distant helical disposition longitudinally of the cable by means of the spirally wound spacing elements which are disposed within the helically formed grooves 18 and 20. It will be noted that only a small proportion of the surface of each conductor is in contact with its companion spiral holding element which leaves the space between the conductors unobstructed except for the portions of the spiral cords which extend into said space.

Referring now to the embodiment illustrated in Fig. 2, provision is made for the cable 10' which is substantially similar to the cable 10. The cable 10' comprises the tubing 12', which is similar in all respects to the tubing 12, and the conductors 14' and 16' which are similar to the conductors 14 and 16, and extend through the equi-distant helical grooves 18' and 20' defined in the wall of the tube 12'. In the present embodiment, the conductors are maintained in position in their respective grooves by spacing elements constituted by the centrally apertured discs 26, formed of a suitable dielectric material, preferably polyethylene. Said discs are disposed at spaced intervals longitudinally of each of the conductors and are dimensioned to have a substantially tight fit within the companion grooves, the discs extending at equally spaced intervals within the companion grooves to mount the conductors therein. Therefore, it will be noted that the conductors 14' and 16' are maintained within the cable 10' in the form of equi-distant helices, in the same manner as the conductors 14 and 16 in the cable 10 of Fig. 1.

Referring now to the embodiment illustrated in Fig. 3, provision is made for the cable 10" which is provided with the conductors 14" and 16" which are embedded in diametrically opposite portions of the tube 12". More specifically, it will be noted that the tube 12" is provided with the opposite thickened wall portions or beads 28—30 which constitute the spacing elements or wall portions which, in the present embodiment, maintain the conductors in equally spaced relation. Each of the beads extends longitudinally of the tube, at the other surface thereof, in the form of an open helix so that the conductor which is embedded therein is maintained in the form of an open helix longitudinally of the tube. Since the beads are in equi-distant disposition throughout the longitudinal extent thereof, it will be readily apparent that the companion conductors 14" and 16" are disposed as equi-distant helices longitudinally of the tube so that the equi-distant helices are maintained in substantially the same form and disposition as in the embodiments of Figs. 1 and 2.

Referring now to Fig. 4 in detail, there is illustrated the cable 32 which is constituted by the co-axially related, inner and outer tubes 34 and 36, respectively, between which is defined the channel or air space 35, in which is disposed the companion conductors 38 and 40. The inner tube 34 is formed of a suitable dielectric material, preferably polyethylene, and is provided on the outer surface thereof with a plurality of integral axial ridges 42 which extend longitudinally of the tube. The outer tube 36 is preferably circular in cross section and is also formed of a suitable dielectric material, preferably polyethylene. Each of the conductors 38 and 40, respectively, is wound about the inner tube or spacing element 34, passing over the ridges thereof, in the form of an open helix which extends longitudinally of the inner tube. As in the previously described embodiment, said helices are disposed in equi-distant relation at all points longitudinally of the inner tube. In order to maintain the companion conductors in said equi-distant helical disposition thereof, the outer tube has a tight fit thereupon and presses the conductors against the ridges 42. It will be noted that since each of the conductors contacts the inner tube 34 only at the pointed ends of the ridges 42 thereof, as the conductors wind about the inner tube in the form of a helix, the area of contact between the conductors and the inner tube is reduced to a minimum so that the space between the conductors is largely occupied by the air dielectric. In order to still further reduce the solid dielectric material between the conductors, the inner tube is preferably hollow, as at 37. Therefore, it will be readily apparent that the present embodiment also provides for a semi-air spaced cable, as in the prior embodiments.

Referring now to Fig. 5 of the drawings, provision is made for the dual tubular cable 32' constituted by the inner tubular member 34' and the outer tubular member 36', said members being co-axial and the conductors 38' and 40' being disposed in the air space or channel 35' between the coaxial tubes. In the present embodiment, the outer surface of the inner tube 34' is grooved at dimetrically opposite portions thereof, as at 44 and 46. It will be understood that said grooves 44 and 46 extend longitudinally of the outer surface of the inner tube or spacing element 42' and that each of said grooves defines an open helix in said outer surface and that the helices defined by each of said grooves are equi-distant throughout the longitudinal extent thereof. It will be noted that the conductor 38' is disposed within the groove 44 and consequently is shaped in the form of an open helix longitudinally of the cable 32'. Similarly, the conductor 40' is disposed in the groove 46 and is also shaped in the form of an open helix which extends longitudinally of the cable 32'. It will be readily apparent that said conductors therefore extend as equi-distant helices longitudinally of the cable 32'. The outer tube 36' is also formed of suitable dielectric material, preferably polyethylene, and is dimensioned to tightly press the conductors into their companion grooves to retain said conductors in the equi-distant helical disposition thereof. In addition to the previously mentioned tubes, the inner tube is preferably hollow to provide an air space 50 being within the inner tube and between the conductors. Consequently, it will be readily apparent that the conductors are separated substantially only by the air dielectric in the space 35' between the tubes, and are separated by reduced wall portions of the inner tube and the dielectric air space 50 at all diametrically opposite points longitudinally of the cable.

While I have illustrated each of the various embodiments in the form of a twin-lead cable, it will be readily apparent that each of the cables may be provided with a greater number of conductors, wherein each of the conductors would be in the form of an open helix and all of the helices would be equi-distant throughout the longitudinal extent of the cable. While as here shown, each of the conductors is in the form of a solid conductor it will be readily apparent that braided conductors may be utilized in place of the solid conductors, as is well known to those skilled in the art. It will also be readily apparent that it is within the scope of the present invention to vary the pitch of the helix into which the various conductors are formed. While I prefer to provide a helix wherein each conductor is completely transposed about the axis of the companion cable substantially every 12 inches, that is, each conductor passes through completely 360 degrees every 12 inches, it will be readily apparent that it is within the scope of the present invention to effect said transpositions at greater or smaller intervals, as may be required. From the foregoing, it will be readily apparent, that in each of the described embodiments, I have provided a transmission cable construction wherein the conductors are transposed spirally at constant intervals throughout the longitudinal extent of the cable, so that the average or over-all capacity between each conductor and an adjacent object from which it may pick up noise, is held equal to reduce interference and noise pick-up. In addition, in view of the semi-air spaced construction in each of the embodiments, wherein the conductors are separated by a minimum of solid dielectric material and by a maximum of air dielectric, dielectric losses are maintained at a minimum to provide a high transmission efficiency and a low standing wave ratio. In addition, the material of the outer tubing makes the cable substantially weather resistant and due to the over-all spherical contour of the cable, the latter is provided with stable characteristics under varying weather conditions since water, moisture, ice or other substance, detrimental to the efficiency of the cable as a transmission line, can never lodge between the leads which constitute the cable.

In the embodiments illustrated in Figs. 1, 2 and 3, the tubular members 10, 10' and 10", respectively, are preferably seamless tubes formed by the well known plastic extrusion process. In the embodiments illustrated in Figs. 4 and 5, the outer tubular members 32 and 32', respectively, as well as the inner tubular members 34 and 34', respectively, are also preferably seamless tubes formed of said plastic extrusion process. The use of a seamless tube as the outer covering member for the conductors assures the weatherproofness and stable characteristics of the cable even under the most adverse atmospheric conditions.

The subject matter of the present application is related to the subject matter of my copending application Serial No. 347,574 filed simultaneously herewith.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A high frequency transmission cable comprising an elongated hollow tube of dielectric material, an elongated hollow dielectric member disposed within said tube and extending substantially coextensive with the length thereof, said tube and said member defining a channel therebetween, and a plurality of electric conductors disposed within said channel and extending substantially coextensive with the length of said tube, said conductors being formed as equi-distant helices, respectively, about said member and being separated in part by the hollow portions of said tube and member, said member having axial ridges at its outer surface which extend substantially coextensive with the length thereof for minimizing the area of contact between said member and said helices to increase the air dielectric between said helices.

2. In a high frequency transmission cable of the type having a plurality of conductors sheathed by a hollow tube, an improved structure for reducing the mutual capacitance between said conductors and for equalizing the external capacitive effect on said conductors, comprising a hollow elongated dielectric member having axial ridges at its outer surface disposed within said tube and extending substantially the length of said tube for defining a channel therebetween, said conductors being disposed within said channel and being formed as equidistant helices about said member and extending substantially the length of said tube.

3. A high frequency transmission cable comprising a seamless elongated hollow tube of dielectric material, an elongated hollow dielectric member having pointed axial ridges at its outer surface being disposed within said tube and extending substantially the length of said tube for forming a channel therebetween, and a pair of conductors disposed within said channel and extending substantially the length of said tube, said conductors being formed into two diametrically opposed helices around said member.

4. In a high frequency transmission cable of the type having a plurality of conductors sheathed by a hollow tube, an improved structure for reducing the mutual capacitance between said conductors and for equalizing the external capacitive effect on said conductors, comprising a hollow elongated dielectric member having axial ridges at its outer surface disposed within said tube and extending substantially the length of said tube for defining a channel therebetween, said conductors being disposed within said channel and being formed as equidistant helices about said member and extending substantially the length of said tube, said tube being spaced from said dielectric member and having a tight fit on said conductors to press them against said ridges, whereby to maintain said conductors in position on said dielectric member.

References Cited in the file of this patent

UNITED STATES PATENTS

| | | |
|---|---|---|
| 475,648 | Wesslau | May 24, 1892 |
| 483,285 | Guilleaume | Sept. 27, 1892 |
| 759,981 | Frisch | May 17, 1904 |
| 1,904,547 | Schumann | Apr. 18, 1933 |
| 2,118,907 | Unterbusch et al. | May 31, 1938 |
| 2,462,887 | Muller | Mar. 1, 1949 |
| 2,648,720 | Alexander | Aug. 11, 1953 |

FOREIGN PATENTS

| | | |
|---|---|---|
| 644,243 | Germany | Apr. 27, 1937 |

OTHER REFERENCES

"High Frequency Cables" by the Federal Telephone and Radio Corporation, Intelin Products, Clifton, New Jersey, 4 pages, copyright 1947.